(12) United States Patent
Chen

(10) Patent No.: US 8,228,992 B2
(45) Date of Patent: Jul. 24, 2012

(54) METHOD AND SYSTEM FOR POWER-AWARE MOTION ESTIMATION FOR VIDEO PROCESSING

(75) Inventor: Xuemin Chen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1320 days.

(21) Appl. No.: 11/871,370

(22) Filed: Oct. 12, 2007

(65) Prior Publication Data

US 2009/0096930 A1    Apr. 16, 2009

(51) Int. Cl.
*H04N 11/02* (2006.01)
(52) U.S. Cl. .................................... 375/240.16
(58) Field of Classification Search .......................... None
See application file for complete search history.

(56) References Cited

U.S. PATENT DOCUMENTS

| | | | | |
|---|---|---|---|---|
| 5,949,484 A * | 9/1999 | Nakaya et al. | ............ | 348/384.1 |
| 5,978,509 A * | 11/1999 | Nachtergaele et al. | ....... | 382/236 |
| 6,128,341 A * | 10/2000 | Kwak | ............................ | 375/240 |
| 6,301,671 B1 * | 10/2001 | Boice et al. | .................... | 713/322 |
| 7,248,631 B2 * | 7/2007 | Wilson | ...................... | 375/240.01 |
| 2004/0158878 A1 * | 8/2004 | Ratnakar et al. | ............... | 725/150 |
| 2005/0018772 A1 * | 1/2005 | Sung et al. | ............... | 375/240.16 |
| 2006/0018381 A1 * | 1/2006 | Luo et al. | ................. | 375/240.16 |
| 2006/0105183 A1 * | 5/2006 | Chu et al. | ...................... | 428/469 |
| 2006/0120613 A1 * | 6/2006 | Su et al. | ........................ | 382/236 |
| 2008/0002772 A1 * | 1/2008 | Song et al. | ............... | 375/240.16 |

* cited by examiner

*Primary Examiner* — Brian Roberts

(74) *Attorney, Agent, or Firm* — Thomas, Kayden, Horstemeyer & Risley, LLP

(57) ABSTRACT

Methods and systems for power-aware motion estimation video processing are disclosed. Aspects of one method may include estimating motion for video data by block matching reduced resolution blocks of video data to generate an initial motion vector. The preliminary motion vector and motion for a previous frame may be used to generate a final motion vector for the block for the present frame using an iterative algorithm. The motion estimation may be dynamically enabled and/or disabled based on content of the video data, available power to a mobile terminal, and/or a user input. The iterations used to generate the final motion vector may be based on content of the video data, available power to a mobile terminal, and/or a user input.

22 Claims, 5 Drawing Sheets

METHOD AND SYSTEM FOR POWER-AWARE MOTION ESTIMATION FOR VIDEO PROCESSING

CROSS-REFERENCE TO RELATED APPLICATIONS/INCORPORATION BY REFERENCE

[Not Applicable.]

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to video processing. More specifically, certain embodiments of the invention relate to a method and system for power-aware motion estimation video processing.

BACKGROUND OF THE INVENTION

Users of electronic devices are becoming more aware of power consumption by those devices. Certainly, users of mobile devices are sensitive to the issue of power consumption since the mobile devices are inherently limited in available battery power, and the battery needs to be recharged periodically. Additionally, the "green" movement is leading to reduced power usage even for electronic devices that are plugged in. Reduced power requirement will benefit the consumer with reduced electric bills, and benefit society with reduced power demand on a power-grid. However, generally, when an electronic device enters a low-power state, functionality of the electronic device is greatly reduced.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for power-aware motion estimation video processing, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for power-aware motion estimation video processing. Aspects of the invention may comprise estimating motion for video data by block matching a reduced resolution block of video data in a present frame with one or more similarly reduced resolution blocks of video data in a previous frame to generate a preliminary motion vector for the block of video data in the present frame. The preliminary motion vector and motion vectors that correspond to blocks of video data from a previous frame may be used to generate a final motion vector for the block of video data for the present frame. A global motion vector may also be used in generating the final motion vector. The final motion vector may be generated using an iterative algorithm that adds the preliminary motion vector to a feedback motion vector. The feedback motion vector may be generated by appropriately processing the result of adding the preliminary motion vector to a feedback motion vector. The final motion vector for each block of video data may be stored in memory for generating motion vectors for blocks of video data in a subsequent frame.

The motion estimation may be dynamically enabled and/or disabled based on content of the video data, available power to a mobile terminal, and/or a user input. The number of iterations used for the iterative algorithm in generating the final motion vector may also be based on content of the video data, available power to a mobile terminal, and/or a user input. The incremental correction for an output generated at each iteration of the iterative algorithm may be adjusted, where the generated output may be the final motion vector when the iterative algorithm is finished with its iterations. Power may also be dynamically turned off to the circuitry that makes motion estimation, if said motion estimation is not needed, such as, for example, during motion-compensated frame rate up-conversion.

Figure 1:
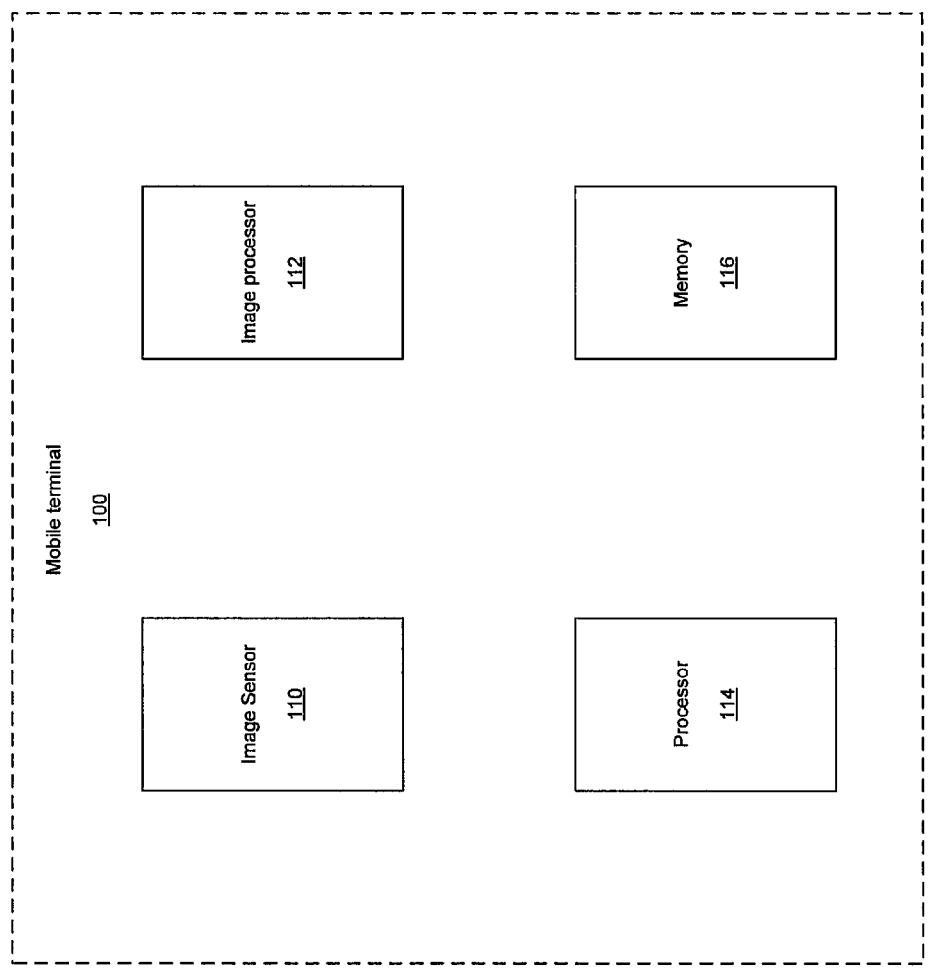
FIG. 1 is an exemplary block diagram of a portion of a mobile terminal, in accordance with an embodiment of the invention.

FIG. 1 is an exemplary diagram of a portion of a mobile terminal, which may be utilized in connection with an embodiment of the invention. Referring to FIG. 1, there is shown a mobile terminal 100. The mobile terminal 100 may comprise an image sensor 110, an image processor 112, a processor 114, and a memory block 116. The image sensor 110 may comprise suitable circuitry and/or logic that may enable capture of light intensity at a plurality of colors, such as, for example, red, green, and blue. The captured light intensity levels may be further processed as video and/or still photograph outputs. These color levels may be converted, for example, to the YUV color space and the resulting color information may be communicated to, for example, the image processor 112 for further processing.

The image processor 112 may comprise suitable circuitry and/or logic that may enable processing of video information. The processing may comprise, for example, compressing the video information from the image sensor 110. The processing may also comprise, for example, decompressing video information communicated to the mobile terminal 100. The processing may comprise, for example, power-aware motion estimation video processing. The processor 114 may determine the mode of operation of various portions of the mobile terminal 100. For example, the processor 114 may set up data registers in the image processor block 112 to allow direct memory access (DMA) transfers of video data to the memory block 116. The processor 114 may also communicate instructions to the image sensor 110 to initiate capturing of images. The memory block 116 may be used to store image data that may be processed and communicated by the image processor 112. The memory block 116 may also be used for storing code and/or data that may be used by the processor 114. The memory block 116 may also be used to store data for other functionalities of the mobile terminal 100. For example, the memory block 114 may store data corresponding to voice communication.

In operation, the processor 114 may initiate image capture by the image sensor 110. The image sensor 110 may communicate the video data corresponding to the captured images to the image processor 112. The image processor 112 may, for example, compress the video data in a suitable format for storing as a file. The image processor 112 functionalities that enable power-aware motion detection are discussed with respect to FIGS. 2-5. The video data in the memory block 116 may be further processed by, for example, the processor 114.

Figure 2A:
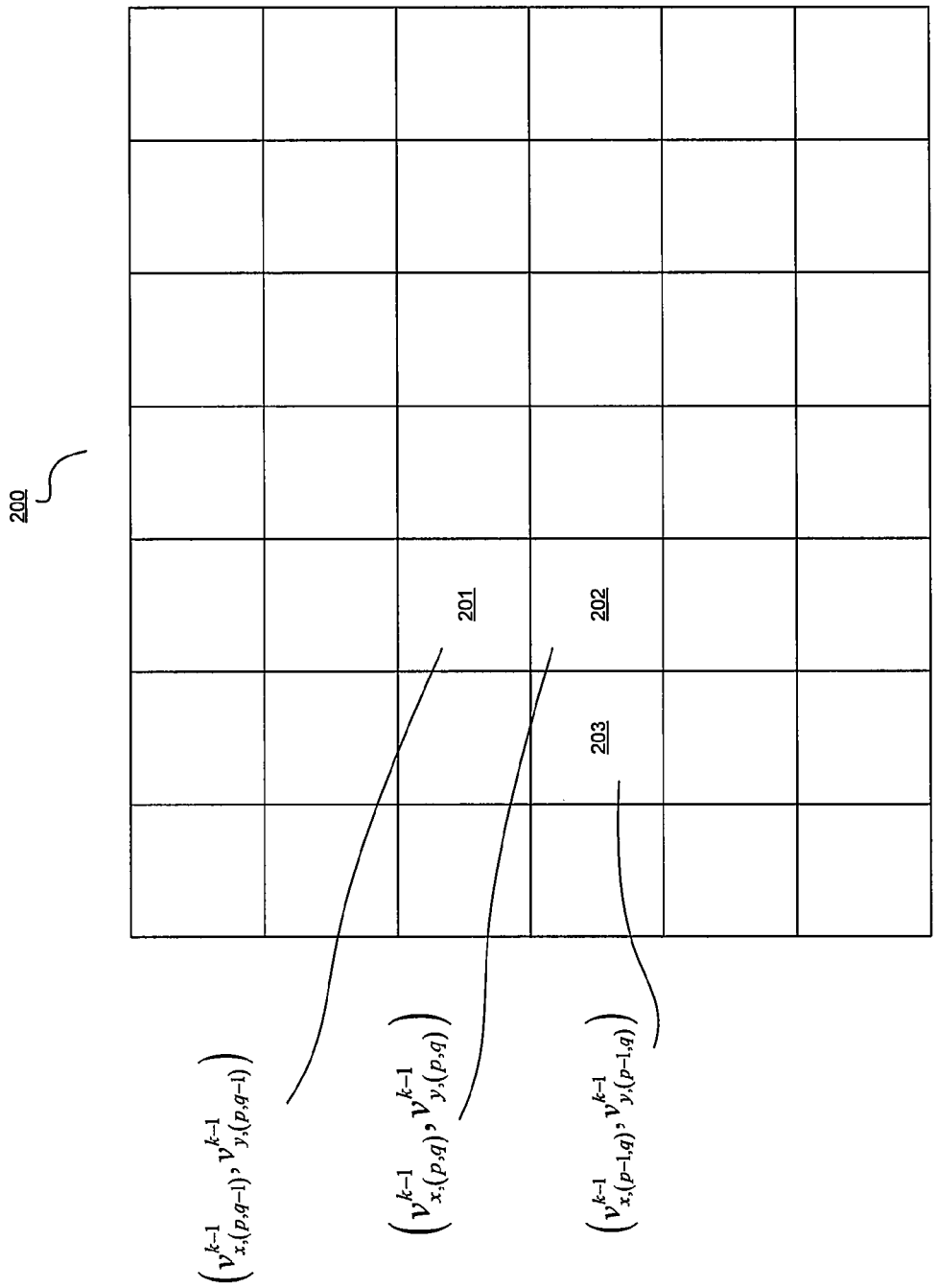
FIG. 2A is an exemplary image lattice illustrating initial motion vector locations, in accordance with an embodiment of the invention.
Figure 2B:
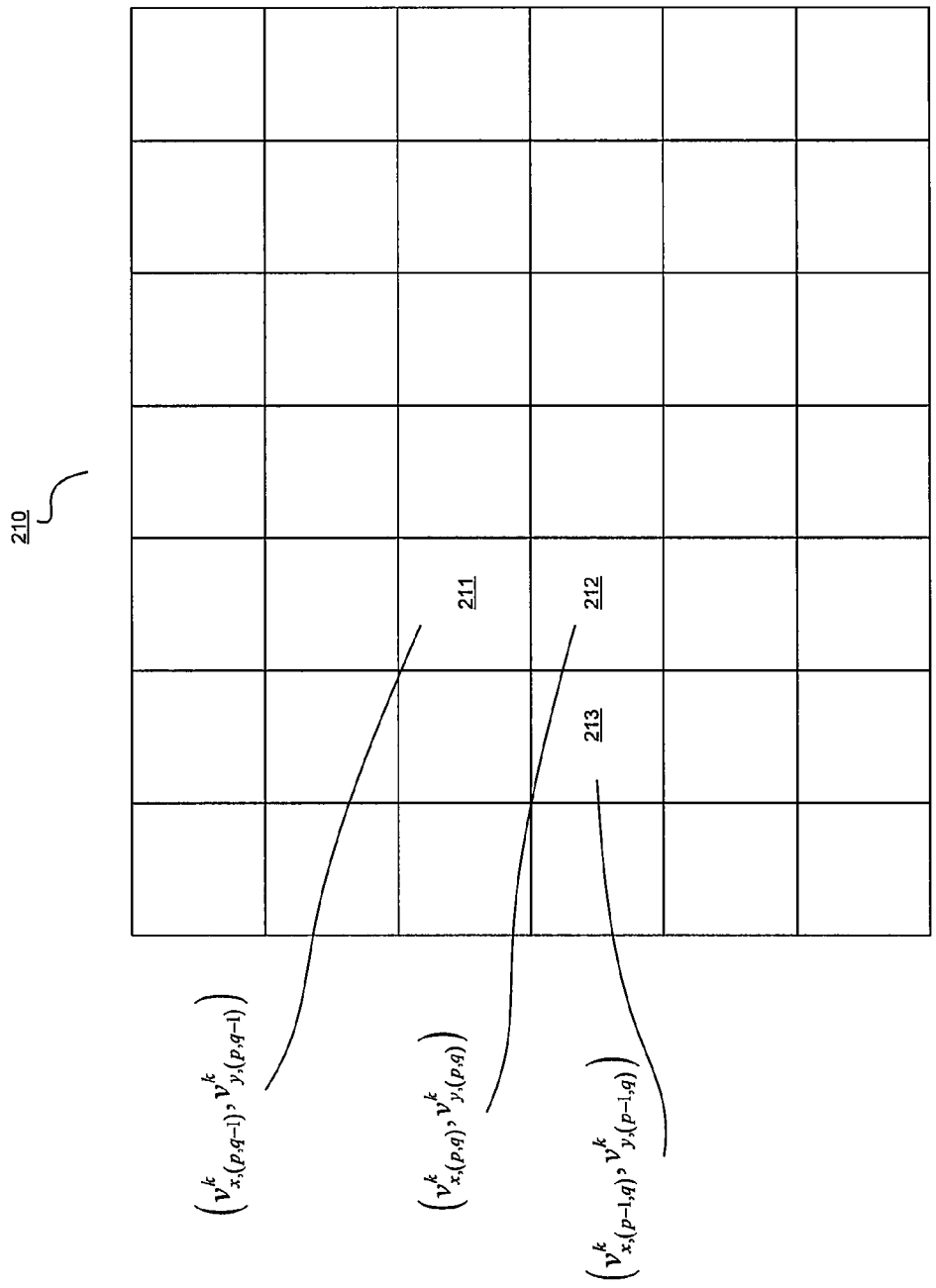
FIG. 2B is an exemplary image lattice illustrating determining motion vector locations, in accordance with an embodiment of the invention.

FIGS. 2A and 2B are exemplary image lattices illustrating motion vector estimations, in accordance with an embodiment of the invention. Referring to FIG. 2A, there is shown the image lattices 200, where the image lattice 200 may be a representation of a previous frame $F^{K-1}$. The image lattice 200 may comprise a plurality of blocks, where each block may comprise, for example, M pixels in a horizontal direction and N pixels in a vertical direction. For example, M and N may each be 16. Referring to FIG. 2B, there is shown the image lattice 210, where the image lattice 210 may be a representation of a present frame $F^K$. The image lattice 210 may be similar to the image lattice 200 with respect to the number of blocks in the image and where each block comprises M×N pixels. The image processor 112 may, for example, process image lattices to determine motion estimation between various frames.

Motion estimation may be an effective but high-complexity technique for video compression and other processing systems. To estimate the motion of a block of video, for example, the block 211 in the frame $F^K$, a search may be initiated to locate a most similar block, or a best matched block, in a previous frame. Based on the search, a motion vector may be generated that may indicate motion from a block in the previous frame to a block in the present frame. For example, the best match for the block 211 in the present frame $F^K$ may be the block 202 in the previous frame $F^{K-1}$. Accordingly, the motion vector for the block 211 may indicate movement from the block 202 in the frame $F^{K-1}$ to the block 211 in the present frame $F^K$. To search for the best matched block, a Full Search (FS) motion estimation may be used, where the algorithm may search through all possible candidates in a search range. This may result in smallest error in matching, or a smallest cost value, but the FS motion estimation may use most resources and most search time.

Other search methods, which may have a higher cost value, but a more efficient use of resources, and a shorter search time may comprise, for example, a multi-step search, a hierarchical search, and a diamond search. Basically, efficiency may be gained by skipping some candidate blocks so that the computational complexity may be lower but the search result may still be close to the best-matched result. Other methods of searching may comprise, for example, a pixel truncation scheme, where some lower bits of a coefficient may be truncated during motion estimation search, and a sub-sampling scheme, which may sub-sample the image to a smaller image for motion estimation search. Accordingly, these various methods may be combined to reduce a search time while limiting loss of precision. A power-aware motion estimation may use, for example, various searching methods with variable search range, and pre-constrained searching candidate numbers, for example, where the limitations may increase for low power instances.

The visual motion estimation may comprise an optimization problem that searches the optimal optical flow estimate given the visual observation, the matching and flow model, and, possibly, additional input from higher cognitive levels. These inputs and models may impose individual constraints on the solution. Thus, finding an optimal solution may be called a constraint optimization problem, where its mathematical formulation and the computational approach chosen may depend on the constraints imposed.

The first constraint chosen may be the minimum displacement constraint. This may come various motion estimation methods that apply the block matching explicitly. The displacement per time unit in image space may serve as a measure for image motion. Typically, the matching method may be described by the following least-squares error equation:

$$E(x,y,t;v_x,v_y,\Delta t)=(P(x,y,t)-P(x+v_x,y+v_y,t+\Delta t))^2, \quad [1]$$

where P may describe the brightness distribution in the image space and time on a Cartesian coordinate system, and $v_x$ and $v_y$ may be translational displacements, also called a motion vector, in image space. The coordinates $v_x^t$ and $v_y^t$ may be determined for a time t for a given $\Delta t$ such that $E(x,y,t;v_x^t,v_y^t,\Delta t)$ is minimized. Accordingly, the equation [1] may be expressed as:

$$\vec{v}^t=(v_x^t,v_y^t)=\arg\min_{v_x,v_y}E(x,y,t;v_x,v_y,\Delta t). \quad [2]$$

The instantaneous estimate of optical flow in an image space may be its vector field, which may be expressed as:

$$\vec{v}_t(x,y,t)=\left(\frac{dv_x^t}{dt},\frac{dv_y^t}{dt}\right). \quad [3]$$

Using Taylor expansion, P(x,y,t) may be expressed as:

$$P(x+v_x,y+v_y,t+\Delta t)=P(x,y,t)+\frac{\partial P}{\partial x}v_x+\frac{\partial P}{\partial y}v_y+\frac{\partial P}{\partial t}\Delta t+\varepsilon(o^2) \quad [4]$$

where $\varepsilon(o^2)$ may comprise higher order terms that are neglected. Thus, equation [1] may be expressed as:

$$E(x,y,t;v_x,v_y,\Delta t)=\left(\frac{\partial P}{\partial x}v_x+\frac{\partial P}{\partial y}v_y+\frac{\partial P}{\partial t}\Delta t\right)^2. \quad [5]$$

An exemplary visual motion estimation may be determined utilizing a flow model that imposes assumptions related to properties of the expected optical flow. For example, an assumption may be that the optical flow estimate is smooth. The smoothness constraint $S(\vec{v})$ may be defined as a quadratic measure of how much the flow field varies across the image space:

$$S(\vec{v}) = \left(\frac{\partial v_x}{\partial x}\right)^2 + \left(\frac{\partial v_x}{\partial y}\right)^2 + \left(\frac{\partial v_y}{\partial x}\right)^2 + \left(\frac{\partial v_y}{\partial y}\right)^2 + \left(\frac{\partial v_x}{\partial t}\right)^2 + \left(\frac{\partial v_y}{\partial t}\right)^2 \quad [6]$$

Smoothness may assume, for example, that locations in images close to each other may be more likely to belong to a same moving region, and thus may be more likely to have a same visual motion. Smoothness may be closely related to a motion field of rigid objects. However, the smoothness constraints may be violated at locations where motion discontinuities are likely to occur, such as, for example, moving object boundaries. This may be due to judder, or temporal artifacts that may be associated with moving images that have been sampled at one rate and converted for display at another rate.

Another assumption of the flow model may be, for example, that some optical flow vectors may be derived from a known reference motion vector. This may be referred to, for example, as a bias constraint. Such constraint may be defined as:

$$B(\vec{v}, \vec{v}_{ref}) = (v_x - v_{x_{ref}})^2 + (v_y - v_{y_{ref}})^2, \quad [7]$$

where B may measure how much the estimated optical flow vector may deviate from a given reference motion $\vec{v}_{ref} = (v_{x_{ref}}, v_{y_{ref}})$. The bias constraint may permit the visual motion estimation algorithm to incorporate and apply a priori information about expected motion. For example, the given reference motion may be a global motion vector. The reference motion vector $\vec{v}_{ref} = (v_{x_{ref}}, v_{y_{ref}})$ may specify a good optical flow estimate under conditions where the visual input may be ambiguous and unreliable. The reference motion vector $\vec{v}_{ref} = (v_{x_{ref}}, v_{y_{ref}})$ may be used to adapt the visual motion estimation algorithm to different visual conditions. The bias constraint may incorporate additional information that may allow a better estimate of visual motion.

The above constraints may be combined such that for a continuous input of the brightness distribution P(x,y,t) on an image region $\Omega \subset R^2$, the problem to solve may be to find $v_x$ and $v_y$ for a given time duration $\Delta t$ such that the cost function $$J(\vec{v}, w_S, w_B) = \int_\Omega (E + w_S \cdot S + w_B \cdot B) d\Omega \quad [8]$$

may be minimal, with $\vec{v}^n = \vec{0}$ along $\partial\Omega$ and $w_S > 0$, and $w_B \geq 0$. The relative weights of the constraints may be set by the parameters $w_S$ and $w_B$. When the visual motion estimation algorithm is first initialized for use, these parameters may be assumed to be constant. However, since these parameters may be considered as a function of time, location, and the current motion estimation, these parameters may be variable. Weighting parameters and the reference motion vector, which may be design dependent, may allow the visual motion estimation algorithm to account for different models of visual motion perception. The motion estimation formulated as the constraint optimization problem expressed by the equation [8] may have a unique solution that may depend continuously on input data.

Although equation [8] may be formulated on a continuous image space $\Omega \subset R^2$, video data may be provided by an imaging device as discrete temporal pictures with discrete spatial resolution. For example, if a discrete image space is defined on an orthogonal lattice, where each node is labeled by two integer values $i \in [0, 1, \ldots, H-1]$ and $j \in [0, 1, \ldots, V-1]$, equation [8] may be reduced to a finite number of locations. To model the cost function for implementation of equation [8], the (i,j) lattice may be partitioned to p×q blocks, where each block may comprise m×n pixels. Accordingly, $i \in [pm, \ldots, pm+m-1]$ where $$p \in \left[0, 1, \ldots, \left\lfloor\frac{H}{m}\right\rfloor - 1\right],$$

and $j \in [qn, \ldots, qn+n-1]$ where $$q \in \left[0, 1, \ldots, \left\lfloor\frac{V}{n}\right\rfloor - 1\right].$$

Since a single motion vector may be determined for each block, there may be p×q motion vectors in an image space, such as, for example, the image lattice 200 and the image lattice 210. Thus, the estimation of the optical flow motion vector may be modeled as a causal discrete constraint optimization process with the cost function for the block (p,q) expressed as:

$$J(\vec{v}, w_S, w_B) = \quad [9]$$
$$\sum_{i=pm}^{pm+m-1} \sum_{j=qn}^{qn+n-1} (P(x_i, y_j, k) - P(x_i + v_x, y_j + v_y, k-1))^2 +$$
$$w_S \cdot \left((v_x - v_{x,(p-1,q)}^k)^2 + (v_y - v_{y,(p-1,q)}^k)^2 + (v_x - v_{x,(p,q-1)}^k)^2 + \right.$$
$$\left. (v_y - v_{y,(p,q-1)}^k)^2 + (v_x - v_{x,(p,q)}^{k-1})^2 + (v_y - v_{y,(p,q)}^{k-1})^2\right) +$$
$$w_B \cdot \left((v_x - v_{x_{ref}})^2 + (v_y - v_{y_{ref}})^2\right)$$

where the partial derivatives of the flow vectors in the smoothness term in equation [8] may be replaced by a difference operator, and an index 'k' may indicate the frame number. The term $v_{b,(c,d)}{}^a$ may indicate a previously estimated motion vector in the frame 'a' for the 'b' direction and at the grid location (c, d). While an embodiment of the invention may use the equation [9], other variations of the equation [9] may be used. For example, the smoothness term with $v_{b,(c,d)}{}^a$ may be altered.

An embodiment of the invention may use a block matching motion-estimation algorithm to minimize a cost function for equation [9]. The equation [9] may have a unique solution as in the continuous case. Accordingly, it follows that $$J'(\vec{v}, w_S, w_B) = 0 \quad [10]$$

may be a sufficient condition for the unique solution. $J(\vec{v}, w_S, w_B)$ may be assumed to be sufficiently regular and at least twice continuously differentiable. Thus, gradient descent on the cost function [9] may be used as an update strategy for an iterative motion estimation algorithm. The changes of each motion vector component $v_x$ and $v_y$ may be negatively proportional to the partial gradients of the cost function, and may be expressed as:

$$\dot{v}_x \propto -\frac{\partial J(\vec{v}, w_S, w_B)}{\partial v_x} \text{ and } \dot{v}_y \propto -\frac{\partial J(\vec{v}, w_S, w_B)}{\partial v_y} \quad [11]$$

until steady state may be reached. This may lead to the following linear partial differential equations, which may be jointly referred to as equation [12]:

$$\dot{v}_x = -A \cdot \left( \sum_{i=pm}^{pm+m-1} \sum_{j=qn}^{qn+n-1} B_{x_i,y_j} \cdot E(x_i, y_j, k; v_x, v_y, 1) + \right.$$
$$\left. w_S \cdot (3v_x - v^k_{x,(p-1,q)} - v^k_{x,(p,q-1)} - v^{k-1}_{x,(p,q)}) + w_B \cdot (v_x - v_{x_{ref}}) \right)$$

$$\dot{v}_y = -A \cdot \left( \sum_{i=pm}^{pm+m-1} \sum_{j=qn}^{qn+n-1} C_{x_i,y_j} \cdot E(x_i, y_j, k; v_x, v_y, 1) + \right.$$
$$\left. w_S \cdot (3v_y - v^k_{y,(p-1,q)} - v^k_{y,(p,q-1)} - v^{k-1}_{y,(p,q)}) + w_B \cdot (v_y - v_{y_{ref}}) \right)$$

where $E(x_i,y_j,k;v_x,v_y,1)=E(x_i,y_j,k)-E(x_i+v_x,y_j+v_y,k-1)$, 'A' is a positive constant, and $$B_{x_i,y_j} = \frac{\partial P}{\partial x_i}, \quad C_{x_i,y_j} = \frac{\partial P}{\partial y_j},$$

as derived from equation [4].

The Steepest-Descent (SD) method may be used for finding a solution to the equation [12]. The SD method may take the previous result $\vec{v}(\rho-1)$ and update it using the instantaneous gradient of the temporal squared error, for example, $E(x_i,y_j,k;v_x,v_y,1)$, to get the following recursive equation $$\vec{v}(\rho) = \vec{v}(\rho-1) + A \cdot (\vec{f}(\vec{v}(0), \vec{v}^{k-1}_{(p-1,q)}, \vec{v}^k_{(p,q-1)}, \vec{v}^k_{(p,q)},$$
$$\vec{v}_{ref}) - (3w_S + w_B) \cdot \vec{v}(\rho-1)), \quad [13]$$

where $$\vec{v}(\rho) = \begin{pmatrix} v_x(\rho) \\ v_y(\rho) \end{pmatrix}$$

and $\rho$ is the iteration step. To simplify the operation, $B_{x_i,y_j}$ and $C_{x_i,y_j}$ may be assumed to be constants for each m×n block. Thus, $$\vec{f}(\vec{v}(0), \vec{v}^k_{(p-1,q)}, \vec{v}^k_{(p,q-1)}, \vec{v}^{k-1}_{(p,q)}, \vec{v}_{ref}) = \quad [14]$$

$$\begin{pmatrix} -B_{p,q} \sum_{i=pm}^{pm+m-1} \sum_{j=qn}^{qn+n-1} E(x_i y_j, k; \vec{v}^T(0), 1) + \\ w_S \cdot (v^k_{x,(p-1,q)} + v^k_{x,(p,q-1)} + v^{k-1}_{x,(p,q)}) + w_B \cdot v_{x_{ref}} \\ -C_{p,q} \sum_{i=pm}^{pm+m-1} \sum_{j=qn}^{qn+n-1} E(x_i y_j, k; \vec{v}^T(0), 1) + \\ w_S \cdot (v^k_{y,(p-1,q)} + v^k_{y,(p,q-1)} + v^{k-1}_{y,(p,q)}) + w_B \cdot v_{y_{ref}} \end{pmatrix}$$

The initial motion vector $\vec{v}(0)$ may be computed by a lower-resolution block matching search algorithm and $B_{x_p,y_q}$ and $C_{x_p,y_q}$ may be estimated, for example, by the block boundary pixel difference. Equation [13] may be, for example, one iteration of the steepest decent algorithm. The parameter A, which may be referred to as the step-size, may control the size of the incremental correction applied to the motion vector from one iteration to the next. The parameter A may need to be determined such that the relationship described by equation [13] is stable, or converges to a solution.

For frames that comprise fast moving scenes, the term $\vec{v}^{k-1}_{(p,q)}$ in equations [13] and [14] may be replaced by a motion vector of the block in the k−1 frame pointed by the vector $-\vec{v}(0)$ from the block (p,q) in the frame k. The minus sign may indicate that the vector may be from a previous frame. Accordingly, a motion vector for a block in a present frame may be set to be equal to the motion vector for a block in a previous frame. For example, if the motion vector for the block 202 points to the block 211, the block 211 may be given a motion vector that may be the same as the motion vector for the block 201. A data flow diagram for an implementation using equation [13] is disclosed with respect to FIG. 3.

Figure 3:
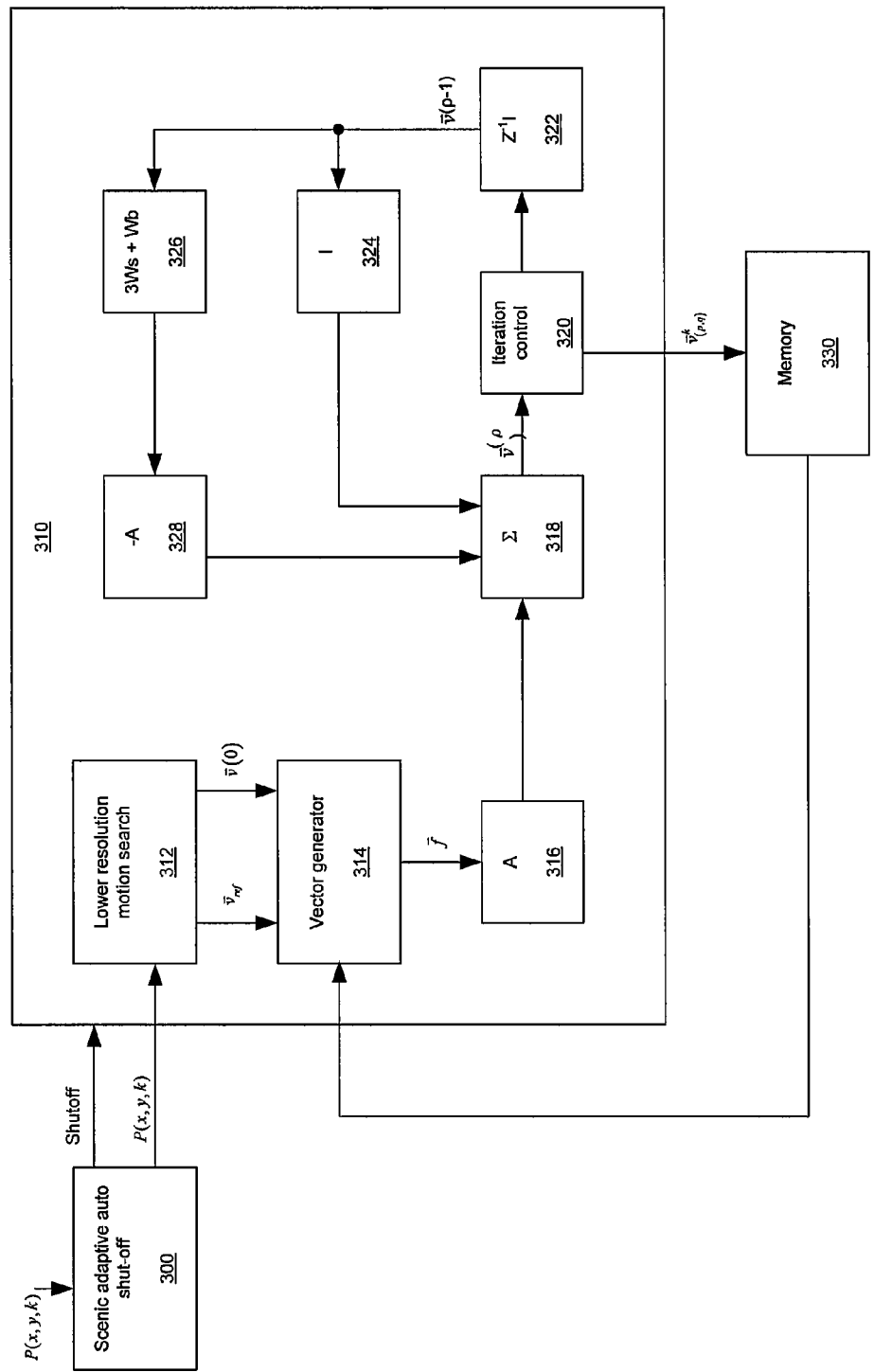
FIG. 3 is an exemplary block diagram illustrating data flow for power-aware motion estimation, in accordance with an embodiment of the invention.

FIG. 3 is an exemplary block diagram illustrating data flow for power-aware motion estimation, in accordance with an embodiment of the invention. Referring to FIG. 3, there is shown a portion of the mobile terminal 100 that comprise an adaptive power control block 300, an adaptive motion estimation engine 310, and memory 320. The adaptive power control block 300 may comprise suitable logic, circuitry, and/or code that may enable controlling power to the adaptive motion estimation engine 310. The power control functionality may be, for example, programmable based on whether the mobile terminal 100 may be in a low-power state. In instances when the mobile terminal 100 is in a low-power state, power to the adaptive motion estimation engine 310 may be turned off by the adaptive power control block 300. In instances when the mobile terminal 100 is in a full-power state, power to the adaptive motion estimation engine 310 may be turned on by the adaptive power control block 300. The threshold voltage(s) at which the adaptive power control block 300 may turn on or off power to the adaptive motion estimation engine 310 may be programmed by, for example, the processor 114. The processor 114 may also communicate a command to the adaptive power control block 300 to turn off the adaptive motion estimation engine 310. The processor 114 may communicate a power control command based on, for example, a user's selection of a power model for use by the mobile terminal 100.

The number of iterations for motion estimation may also be based on, for example, limitation of the power source and/or the complexity of video data. For example, while the mobile terminal 100 may be in a full-power state, if video data complexity is deemed to be decreasing, then the number of iterations for motion estimation may be reduced. If the video data complexity is simple enough, the motion estimation engine may be turned off. The determination of video data complexity may be design dependent. Additionally, even with complex video data, in instances where voltage level of, for example, a battery (not shown) is decreasing, the number of iterations for motion estimation may be reduced. Video data complexity may be determined by, for example, the image processor 112 and/or the processor 114. Accordingly, the image processor 112 and/or the processor 114 may program the number of iterations to execute for motion estimation for various levels of video data complexity.

The adaptive motion estimation engine 310 may be an implementation of, for example, the equation [13]. The adaptive motion estimation engine 310 may comprise a low resolution search block 312, an initial motion vector generator block 314, amplitude adjuster blocks 316, 324, 326, and 328, a summer block 318, an iteration control block 320, and a delay block 322. The low resolution search block 312 may comprise suitable logic, circuitry, and/or code that may sample video blocks in a video frame to generate lower resolution video blocks for the video frame. The low resolution search block 312 may then determine a global motion vector for a frame. The low resolution search block 312 may also search for best matches for each low resolution video block to generate low resolution motion vectors for each video block in the video frame, where the scope of search may be controlled by, for example, the image processor 112 and/or the processor 114. Accordingly, the scope of the search may be the blocks in the video frame, or a portion of the blocks in the video frame.

The initial motion vector generator block 314 may comprise suitable logic, circuitry, and/or code that may receive input data from the low resolution search block 312 as well as motion vectors from a previous video frame. Various embodiments of the invention may use different motion vectors from a previous frame, depending on the solution used for the equation [13].

The amplitude adjuster blocks 316, 324, 326, and 328 may comprise suitable logic, circuitry, and/or code that may enable multiplying an input digital data by a suitable value, where the value used may be controlled by, for example, the image processor 112 and/or the processor 114.

The summer block 318 may comprise suitable logic, circuitry, and/or code that may enable adding digital data from a plurality of sources to output a single digital data. The iteration control block 320 may comprise suitable logic, circuitry, and/or code that may enable controlling a number of iterations used in determining a motion vector for a block in a video frame. The delay block 322 may comprise suitable logic, circuitry, and/or code that may enable providing suitable delay such that a motion vector for a block may be processed to generate a next iteration of a motion vector.

Memory 320 may be, for example, a part of the memory block 116, and may store the motion vectors generated by the adaptive motion estimation engine 310. The motion vectors stored in the memory 320 may be communicated to, for example, the low resolution search block 312 and/or the initial motion vector generator block 314.

In operation, video data for a video block in a present frame $F^K$ may be communicated to the scene adaptive auto shut-off block 300. The scene adaptive auto shut-off block 300 may communicate the video data to the low resolution search block 312 if it determines that the adaptive motion estimation engine 310 may be turned on to generate motion vectors. If the scene adaptive auto shut-off block 300 determines that the adaptive motion estimation engine 310 may need to be shut off, the video data may be, for example, further processed by the image processor 112 without motion estimation.

The low resolution search block 312 may sample the video data to generate a lower resolution video block that may correspond to the video data from the scene adaptive auto shut-off block 300. The scene adaptive auto shut-off block 300 may also be controlled via a shut-off command from, for example, the processor 114. For example, the processor 114 may dynamically communicate a command to the scene adaptive auto shut-off block 300 to shut off power to the adaptive motion estimation engine 310 when motion estimation is not needed. For example, when the mobile terminal 100 is performing motion-compensated frame rate up-conversion, a frame may be repeated and motion estimation may not be needed. Accordingly, the processor 114 may communicate a command to have the adaptive motion estimation engine 310 turned off to save power.

The low resolution search block 312 may then generate a low resolution motion vector $\vec{v}(0)$ for each lower resolution block. The low resolution search block 312 may also output a global motion vector $\vec{v}_{ref}$, which may be, for example, stored in the low resolution search block 312 by the processor 114. The motion vectors may be communicated to the vector generator block 314. The vector generator block 314 may use the motion vectors from the low resolution search block 312 and motion vectors for blocks from a previous frame to determine a motion vector for a block in the present frame. The motion vectors for blocks from a previous frame may be stored, for example, in the memory 320. For example, a motion vector $\vec{f}$ for the block 212, which may also be referred to as block (p,q) in the present frame $F^K$, may be determined based on motion vectors for the blocks 201, 202, and 203 in the previous frame $F^{K-1}$, as well as the global motion vector $\vec{v}_{ref}$ for the present frame $F^K$ and the low resolution motion vector $\vec{v}(0)$ for the block 212 in the present frame $F^K$. The motion vector $\vec{f}$ may be represented by the equation [14].

The motion vector $\vec{f}$ may be communicated to the amplitude adjuster block 316, which may multiply the motion vector $\vec{f}$ by a parameter A, where the parameter may be a programmable parameter. The parameter A may be, for example, a positive value that may be chosen to ensure convergence to a solution. The output of the amplitude adjuster block 316 may be constant until the motion vector is generated at the final iteration. The output of the amplitude adjuster block 316 may be communicated to the summer block 318, which may combine the outputs of the amplitude adjuster block 316, 324, and 328. The output of the summer block 318 may be referred to as a present iteration motion vector $\vec{v}(\rho)$. The iteration control block 320 may determine whether a number of iterations selected for motion estimation may have occurred. If so, the present iteration motion vector $\vec{v}(\rho)$ may be saved as a final motion vector for a block, for example, the block (p,q), in the memory 320. Accordingly, the motion vectors for all blocks in a frame may be saved in the memory 320 for future use, including for generation of motion vectors for a subsequent frame.

If more iterations are to take place to generate the motion vector, the present iteration motion vector $\vec{v}(\rho)$ may be communicated to the delay block 322. The delay block 322 may delay the present iteration motion vector $\vec{v}(\rho)$ such that it may be used as a previous iteration motion vector $\vec{v}(\rho-1)$, as shown in the equation [14]. Various embodiments of the invention may, for example, set the output of the delay block 322 to zero at the start of a first iteration, or to a known pre-determined value.

The previous iteration motion vector $\vec{v}(\rho-1)$ may be communicated to the amplitude adjuster blocks 324 and 326. The amplitude adjuster blocks 324 may be output a motion vector that may be identical to the motion vector $\vec{v}(\rho-1)$. The output of the amplitude adjuster block 324 may be communicated to the summer block 318 for generating a subsequent present iteration motion vector $\vec{v}(\rho)$. The amplitude adjuster block 326 may, for example, multiply the motion vector $\vec{v}(\rho-1)$ by a parameter of "3Ws+Wb," where the weighting parameter Ws may be greater than zero and the weighting parameter Wb may be greater than or equal to zero. Various embodiments of the invention may initially set the weighting parameters Ws and Wb to some constant values, where the constant values may depend on, for example, different models of visual motion perception. Accordingly, the initial values of the weighting parameters Ws and Wb may be design and/or implementation dependent.

The output of the amplitude adjuster block 326 may be communicated to the amplitude adjuster block 328, which may multiply the data communicated from the amplitude adjuster block 326 by a parameter of "–A." The parameter –A may be a negative of the parameter A used by the amplitude adjuster block 326 316. The output of the amplitude adjuster block 328 may be communicated to the summer block 316. The output of the amplitude adjuster blocks 324 and 328 may be referred to as a feedback motion vector.

Figure 4:
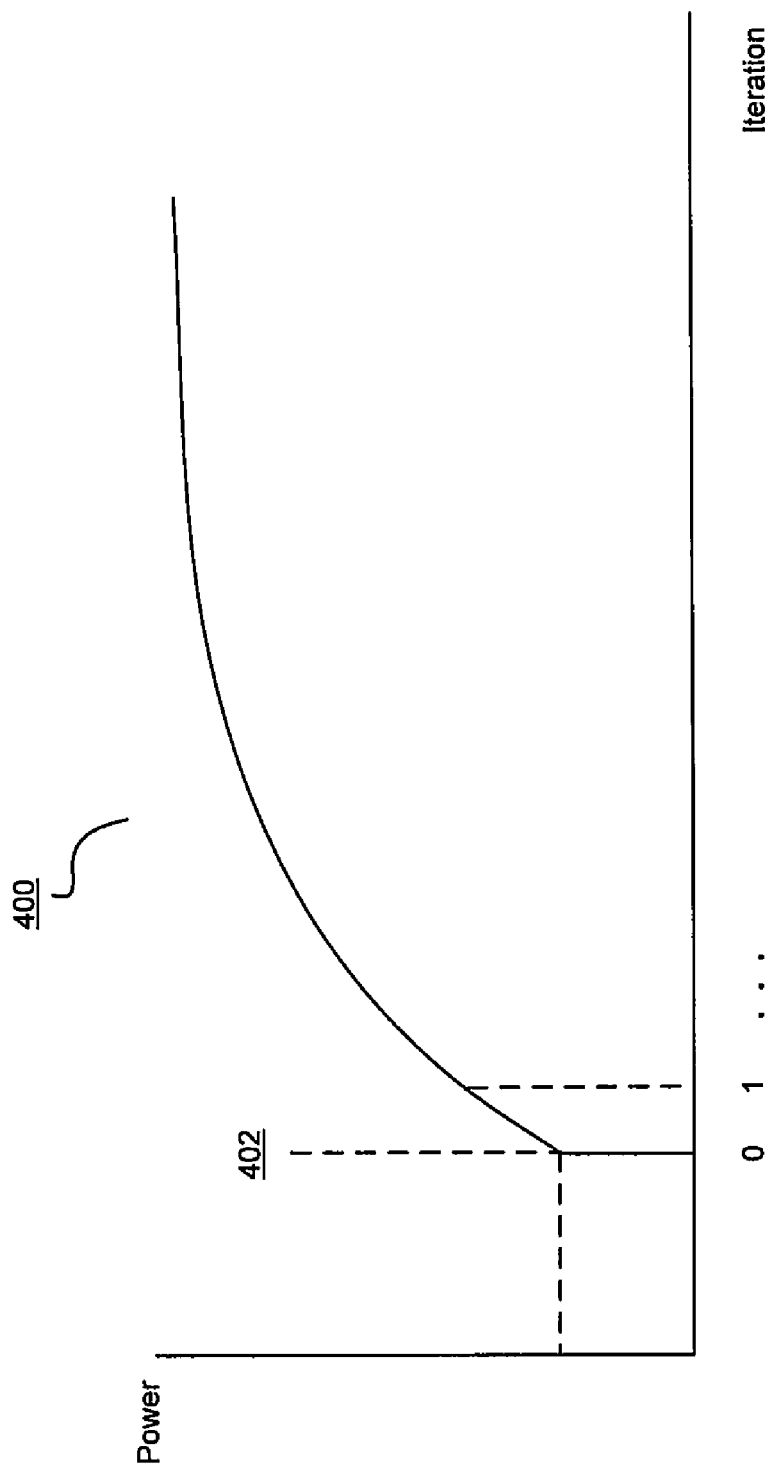
FIG. 4 is an exemplary graph illustrating power consumption versus number of iterations in determining motion estimation, in accordance with an embodiment of the invention.

FIG. 4 is an exemplary graph illustrating power consumption versus number of iterations in determining motion estimation, in accordance with an embodiment of the invention. Referring to FIG. 4, there is shown the graph 400 that may represent, for example, power used in processing video. For example, graph point 402 may indicate zero iterations for generating a motion vector. The number of iterations may be set to zero, for example, when the adaptive motion estimation engine 310 may be turned off. Other embodiments of the invention may allow a separate state where the adaptive motion estimation engine 310 may be turned on, but with zero iterations, and where the adaptive motion estimation engine 310 may be turned off. Accordingly, video processing may result in increased power usage as the number of iterations for motion vector estimation increases, until the maximum number of iterations is reached.

Various embodiments of the invention may, therefore, control power consumption for video processing by turning on or off, for example, the adaptive motion estimation engine 310. Power consumption may also be changed by adjusting the number of iterations allowed for determining a motion vector for a block of video in a present frame. Accordingly, by suitably determining power consumption versus operation of the adaptive motion estimation engine 310, various power models may be generated. A user of the mobile terminal 100, for example, may then select a desired power model for video processing, and the image processor 114 may be appropriately configured.

For example, the processor 114 may communicate a command to the adaptive power control block 300 to turn off power to the adaptive motion estimation engine 310. The processor 114 may also communicate a command to the power control block 300 to turn on power to the adaptive motion estimation engine 310. When the adaptive motion estimation engine 310 is turned on, various parameters may be adjusted, for example, by the processor 114. For example, the parameters A, Ws, Wb, and –A for the amplitude adjuster blocks 316, 324, 326, and 328, respectively may be set to desired values. Additionally, the number of iterations may be set for the iteration control block 320.

The scene adaptive auto shut-off block 300 may also be controlled via a shut-off command from, for example, the processor 114 to save power for certain applications, such as, for example, motion-compensated frame rate up-conversion where a frame may be repeated to save power.

In accordance with an embodiment of the invention, aspects of an exemplary system may comprise the scenic adaptive auto shut-off block 300, the adaptive motion estimation engine 310, and memory 320. The scenic adaptive auto shut-off block 300 may control, for example, power to the adaptive motion estimation engine 310. The scenic adaptive auto shut-off block 300 may either turn on or turn off power to the adaptive motion estimation engine 310 based on video content of video data communicated to the scenic adaptive auto shut-off block 300 and/or available power for the mobile terminal 100. The power level at which the scenic adaptive auto shut-off block 300 turns on or off the adaptive motion estimation engine 310 may be design and/or implementation dependent. For example, the threshold value for the power level may be set by the processor 114 to a default value, or according to a power model selected by a user.

When the power to the adaptive motion estimation engine 310 is turned on, the adaptive motion estimation engine 310 may make motion estimations for video data. The motion estimations may comprise a motion vector for each block of video data in a frame. For example, the low resolution search block 312 may generate a low resolution block from video data for the block 212 in the present frame $F^K$ by sampling the video data in the block 212. The low resolution search block 312 may then perform block matching for the low resolution block of video data with one or more similarly sampled low resolution blocks of video data in a previous frame, for example, the frame $F^{K-1}$. The block matching may result in a low resolution motion vector for the block 212 in the present frame. The low resolution search block 312 may also output a global motion vector.

The initial motion vector generator block 314 may generate an initial motion vector, or a preliminary motion vector, based on the low resolution motion vector for the block 212 and the global motion vector. The initial motion vector may also be based on, for example, motion vectors from the previous frame. The initial motion vector may be summed by the summer block 318 with a feedback motion vector, where the feedback motion vector may be iteratively adjusted. The feedback motion vector may be generated by processing the output of the summer block 318 via the delay block 322, and the amplitude adjuster blocks 324, 326, and 328.

The number of iterations may be controlled, for example, by the processor 114. The number of iterations used for the iterative algorithm in generating the final motion vector may be, for example, communicated by the processor 114 to the iteration control block 320. After the number of iterations allowed by the iteration control block 320, the summed result of the initial motion vector and the feedback motion vector may be saved in memory 320 as a final motion vector for the block 212. The final motion vector for each of the blocks in the present frame $F^K$ may be used to generate motion vectors for blocks of video data of a subsequent frame.

Various embodiments of the invention may also adjust the number of iterations based on video content of video data communicated to the scenic adaptive auto shut-off block 300 and/or levels of available power for the mobile terminal 100. The power levels at which the scenic adaptive auto shut-off block 300 may adjust the number of iterations may be design and/or implementation dependent. For example, the threshold values for the power levels may be set by the processor 114 to a default value, or according to a power model selected by a user. The processor 114, for example, may also control the incremental correction for an output generated at each iteration of the iterative algorithm, wherein the generated output may be the final motion vector when the iterative algorithm is finished with its iterations. A processor, such as, for example, the processor 114 may also communicate a command to the scenic adaptive auto shut-off block 300 to turn off power to the adaptive motion estimation engine 310. This may occur when motion estimation is not needed during such times as, for example, when motion-compensated frame rate up-conversion repeats a frame.

Another embodiment of the invention may provide a machine-readable storage, having stored thereon, a computer program having at least one code section executable by a machine, thereby causing the machine to perform the steps as described herein for power-aware motion estimation video processing.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will comprise all embodiments falling within the scope of the appended claims.

What is claimed is:

1. A method for processing video, the method comprising:
generating a plurality of power models for controlling motion estimation, wherein said generated plurality of power models correspond to varying power consumption requirements when performing said motion estimation, and wherein said motion estimation comprises:
estimating motion for video data by block matching a first block of video data in a present frame with one or more blocks of video data in a previous frame to generate an initial motion vector for said first block of video data; and
generating a final motion vector for said first block of video data using an iterative algorithm that utilizes said initial motion vector, and one or more motion vectors that each corresponds to one block of video data from a previous frame;
controlling said motion estimation based on selection of one of said generated plurality of power models; and
dynamically adjusting a number of iterations used for said iterative algorithm in generating said final motion vector, based on said selected one of said generated plurality of power models.

2. The method according to claim 1, comprising sampling said first block of video data to generate a lower resolution block of video data, wherein said lower resolution block of video data is used for said block matching with similarly sampled lower resolution blocks of video data for said previous frame.

3. The method according to claim 1, comprising dynamically enabling said motion estimation based on content of said video data.

4. The method according to claim 1, comprising dynamically disabling said motion estimation based on content of said video data.

5. The method according to claim 1, comprising dynamically adjusting said number of iterations used for said iterative algorithm in generating said final motion vector based on available power.

6. The method according to claim 1, comprising dynamically enabling said motion estimation based on available power.

7. The method according to claim 1, comprising dynamically disabling said motion estimation based on available power.

8. The method according to claim 1, comprising storing said final motion vector in memory for use in estimating motion for a subsequent frame.

9. The method according to claim 1, comprising controlling incremental correction for an output generated at each iteration of said iterative algorithm, wherein said generated output is said final motion vector when said iterative algorithm is finished with its iterations.

10. The method according to claim 1, comprising dynamically turning off power for circuitry that makes said motion estimation if said motion estimation is not needed.

11. A system for processing video, the system comprising:
one or more circuits for use in a video device, said one or more circuits being operable to generate a plurality of power models for controlling a motion estimation in said video device, wherein said plurality of generated power models correspond to varying power consumption requirements when performing said motion estimation, and wherein said motion estimation comprises:
estimation of motion for video data by block matching a first block of video data in a present frame with one or more blocks of video data in a previous frame to generate an initial motion vector for said first block of video data; and
generation of a final motion vector for said first block of video data using an iterative algorithm that utilizes said initial motion vector, and one or more motion vectors that each corresponds to one block of video data from a previous frame;
said one or more circuits are operable to control said motion estimation based on selection of one of said generated plurality of power models; and
wherein said one or more circuits enable dynamically adjusting of a number of iterations used for said iterative algorithm in generating said final motion vector, based on said selected one of said generated plurality of power models.

12. The system according to claim 11, wherein said one or more circuits enable sampling of said first block of video data to generate a lower resolution block of video data, wherein said lower resolution block of video data is used for said block matching with similarly sampled lower resolution blocks of video data for said previous frame.

13. The system according to claim 11, wherein said one or more circuits enable dynamically enabling of said motion estimation based on content of said video data.

14. The system according to claim 11, wherein said one or more circuits enable dynamically disabling of said motion estimation based on content of said video data.

15. The system according to claim 11, wherein said one or more circuits enable dynamically adjusting of said number of iterations used for said iterative algorithm in generating said final motion vector based on available power.

16. The system according to claim 11, wherein said one or more circuits enable dynamically enabling of said motion estimation based on available power.

17. The system according to claim 11, wherein said one or more circuits enable dynamically disabling of said motion estimation based on available power.

18. The system according to claim 11, wherein said one or more circuits enable storing of said final motion vector in memory for use in estimating motion for a subsequent frame.

19. The system according to claim 11, wherein said one or more circuits enable controlling of incremental correction for an output generated at each iteration of said iterative algorithm, wherein said generated output is said final motion vector when said iterative algorithm is finished with its iterations.

20. The system according to claim 11, wherein said one or more circuits comprise one or more processors that enable dynamically turning off power to said one or more circuits that enable said estimation of said motion for video data if said motion estimation is not needed.

21. A method for processing video, the method comprising:

generating a plurality of power models for controlling motion estimation, wherein said generated plurality of power models correspond to varying power consumption requirements when performing said motion estimation;

controlling based on a selected one of said generated plurality of power models, power to turn on a motion estimation circuit;

generating an initial motion vector based on data output by a low resolution motion search module within said motion estimation circuit;

iteratively adding said initial motion vector to a processed version of said initial motion vector; and controlling based on said selected one of said generated plurality of power models, a number of iterations for said iteratively adding.

22. A system for processing video, the system comprising:

one or more processors or circuits comprising an initial vector generator and a low resolution motion search module that enables initialization of motion vectors, said one or more processors or circuits being operable to:

generate a plurality of power models for controlling motion estimation, wherein said generated plurality of power models correspond to varying power consumption requirements when performing said motion estimation;

control based on a selected one of said generated plurality of power models, power to a motion estimation circuit;

initialize a motion vector;

generate an initial motion vector based on data output by said low resolution motion search module;

iteratively add said initial motion vector to a processed version of said initial motion vector; and control based on said selected one of said generated plurality of power models, a number of iterations for said iteratively adding.

* * * * *